United States Patent Office 3,322,528
Patented May 30, 1967

3,322,528
FERTILIZER COMPOSITIONS CONSISTING OF ISOBUTYLIDENE-DIUREA AND METHOD OF USING
Masao Hamamoto, 173-7 Tamagawaseta-cho, Setagaya-ku, Tokyo, Japan, and Yasuhiro Sakaki, 61 2-chome, Fukasawa-cho, Setagaya-ku, Tokyo, Japan
No Drawing. Filed Aug. 22, 1961, Ser. No. 134,047
Claims priority, application Japan, Aug. 30, 1960, 35/36,282
8 Claims. (Cl. 71—29)

This invention relates to fertilizers containing slightly water-soluble gradually-available nitrogenous compound. More particularly, this invention relates to a fertilizer containing slightly soluble urea-compound which is obtained by condensation of urea and isobutyl aldehyde and to a method of producing such a fertilizer.

Although a useful nitrogenous fertilizer, urea is inherently apt to loose nitrogen to a considerable extent as it is manured. Because of the great water-solubility urea is often leached by rain or by water contained in soil. Further, urea tends to be changed to nitric acid in soil by being affected by nitrifying bacteria to be leached. Thus substantial portion of nitrogen contained in fertilizer comes to nothing losing its usefulness. Especially, when manured in a paddy field this trend is stimulated. In addition, urea is decomposed by denitrifying bacteria existing in soil to scatter in air enhancing the loss.

As a measure to reduce the loss there has been contemplated a method of changing urea to a compound which is slightly soluble in water. For example, studies have been made for converting urea by way of reaction with formaldehyde to methylene urea, methylol urea, and so forth which are available in market under the trade-name of "Ureaform." Further, the reaction product of urea and acetaldehyde is known under the name of "Urea-Z." Still further, a study on crotonylidene diurea, which is a reaction product of urea and crotonaldehyde has been made known lately.

However, any of these reaction products are not satisfactory because of difficulties involved in the manufacturing, manuring effect, and injury against plants. For example, conditions under which "Ureaform" is manufactured are difficult to control so that "Ureaform" of a definite composition is hardly obtained. Besides, the manuring effect which is often in excess of gradual availability arrests the practical use. Moreover, "Urea-Z" has generally the same tendency as the abovementioned "Ureaform" and in addition it is of disadvantage that the time required for solidification is too long when manufactured on an industrial scale. Furthermore, because of an excess of gradual availability of crotonylidene diurea no manuring effect is expected for winter crops; further, injury by free croton aldehyde is significant, too.

An object of the present invention is to provide a fertilizer containing nitrogenous compound which is easy to manufacture and slightly soluble.

Another object of the invention is to provide fertilizer which is of appropriate gradual availability and low in nitrogen loss, giving plants no injury.

Further object of the invention is to provide a method of manufacturing on an industrial scale a nitrogen-containing fertilizer, which is of an appropriate gradual availability, low in nitrogen loss and suffers no injury by chemicals.

Still further object of the invention is to provide a fertilizer which may be easy compounded with any of various other fertilizers such as phosphatic fertilizer, potassium fertilizers and water-soluble nitrogenous fertilizer.

Other objects and advantages of the invention will be obvious during the course of the following description.

The condensation reaction of urea and isobutyl aldehyde for manufacturing the fertilizer according to the invention takes place, for example, as follows:

As added to an aqueous urea solution, a portion of isobutyl aldehyde is dissolved in water phase comprising lower layer, but the major portion floats up in the upper layer. By way of stirring, however, the reaction gradually proceeds in water phase and aldehyde in upper layer is dissolved therein accompanied with exothermic reaction and finally forms a homogeneous phase. Subsequently fine insoluble solids begin to precipitate and the reaction is nearly completed in about 10 min.

In the case where a concentrated aqueous urea solution having a concentration more than 25% is employed as starting material, the reaction mixture becomes solid almost entirely and then dry. On the contrary, in the case where a more dilute aqueous urea solution is employed the reaction mixture turns slurry. In the latter case it is possible to easily separate a reaction product from said reaction mixture by way of subsequent simple treatment such as filtration, washing or drying. These solid products containing for the most part slightly soluble isobutylidene diurea and unreacted urea, in some cases, may be employed as fertilizer as will be described hereinafter.

The fact that isobutylidene diurea forms by way of condensation reaction has been confirmed by an analysis of the aforesaid solid product which was made after washing thereof with a sufficient quantity of water for removing coexisting urea.

Elementary analysis.—for $C_6H_{14}O_2N_4$: Calculated, C, 41.38%; H, 8.05%; O, 18.39%; N, 32.18%. Analysed, C, 41.23%; H, 7.93%; O, 18.78%; N, 32.06%.

In view of the above analysis, it is presumed that the condensation reaction as represented by the following equation takes place:

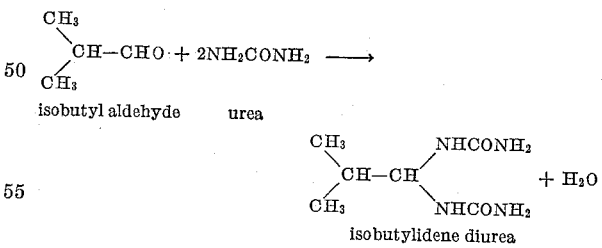

In order to carry out this reaction it will be necessary only to adjust the mol ratio of urea to isobutyl aldehyde to 2 to 10, preferably to 2 to 4 so that the amount of urea remaining in the reaction product, i.e., free urea contained in the fertilizer according to the invention may be optionally changed. If required, however, an amount of urea less than equivalent mol of isobutyl aldehyde may be employed.

Other various reaction conditions exercise no substantial effect on progressing the condensation reaction. For instance, although an acid reaction liquor is preferred because of the faster rate of reaction, the reaction liquor may be either neutral or basic. Although a temperature of about 100° C. may be employed for performing the reaction, temperatures ranging from 10 to 80° C. are preferred in order to evade a loss due to evaporation of isobutyl aldehyde. From the viewpoint of evading a loss of isobutyl aldehyde it is further desirable to employ an aqueous urea solution having concentration of about 50% by weight or below and to perform the reaction in a closed vessel.

While in the foregoing there has been described a condensation reaction in liquid phase, the said reaction will be carried out by impregnating urea or a solid material containing urea with isobutyl aldehyde by means of spray.

In utilizing the fertilizers of the invention, the reaction products manufactured by the method as has been described in the foregoing are manured in the same manner as with known fertilizers.

The condensation products of urea and isobutyl aldehyde are effective as fertilizers in their own form. However, they may also be used by compounding them with other various fertilizers such as phosphatic, potassium, and water-soluble ammonium fertilizer. As has been described the condensation product consists, in general, mainly of isobutylidene diurea, containing urea in various proportions. Isobutylidene diurea may be used because of its manuring effect substantially similar to urea excepting gradual availability. The slightly water-soluble fertilizer is generally of inadequate manuring effect, though lasting as a whole, for the initial growth of plant. Hence the condensation reaction product containing free urea in an appropriate proportion is used in preference to isobutylidene diurea alone because the former possesses both of the manuring effect of slightly water-soluble nitrogen and water-soluble nitrogen.

Further, in compounding the condensation reaction product of the invention with other fertilizers the germination of manuring effect of isobutylidene diurea is affected by pH of the compounded fertilizer. That is to say, the lower the pH the more gradual availability is lost so that the purpose of controlling germination of manuring effect is not fulfilled. For example, in the case where the condensation reaction product of the invention is compounded with calcium superphosphate it is preferred to adjust pH to nearly neutrality by an addition of alkaline substance, such as ammonia, dolomite, magnesite or fused magnesium phosphate in order to compensate the low pH of calcium superphosphate.

In practice of the manufacture of a mixed fertilizer, the product is taken out upon completion of the condensation reaction of urea and isobutyl aldehyde followed by compounding with one or more kind of nitrogenous fertilizer, phosphatic fertilizer and potassium fertilizer; or in the course of the condensation reaction, these fertilizers may be added followed by solidification together with the condensation reaction product to produce a mixed fertilizer. In this connection it may be noted that a further addition of inactive substances such as peat, clay, Portland cement, etc. may be made for facilitating manuring.

The characteristics of the fertilizer according to the invention are summarized in the following:

(a) Easy manufacture.

In particular, the manufacture of isobutylidene diurea or of a product containing isobutylidene diurea having a definite composition is effected in a shorter length of time by condensation reaction wherein only adjustment of mol ratio of urea to aldehyde is needed. Accordingly, the present method is more advantageous as compared with the conventional methods for manufacturing aldehyde-urea condensate.

(b) Slight solubility in water.

The fertilizers according to the invention contain necessarily isobutylidene diurea, which is a compound product of condensation reaction and which is of slight solubility such as 0.1–0.01 g./100 cc. $H_2O$ at room temperature.

(c) Manuring effect similar to urea:

When dissolved in water, isobutylidene diurea is gradually decomposed by interaction with water and forms urea and aldehyde. The velocity of hydrolysis varies with the temperature, pH, etc. of the liquor.

Hence the fertilizer according to the invention, when manured, is dissolved in water, and hydrolized, giving farm products the same manuring effect as urea. However, because of the slight solubility isobutylidene diurea shows gradual availability accompanied with a lesser nitrogen loss and a reduced plant injury due to concentration effect.

(d) Feasibility of controlling germination of manuring effect:

The fertilizer according to the invention is easy to control the germination of manuring effect by selection of kind or amount of mixed fertilizers or by adjustment of granularity or pH.

Accordingly, it is feasible to provide a fertilizer which has suitable properties in compliance with the soil of farmland or paddy field or the kind of crops of farmland or paddy field and climate.

(c) No fear for injury by fertilizer:

The injury by the fertilizer according to the invention is very little. In other words, among all kinds of aldehyde the injury by free isobutyl aldehyde is smallest which forms as a result of hydrolysis following fertilization.

The particulars of fertilizers according to the invention having regard to manufacture, utilization, manuring effect, and injury against plants will be obvious by the description given in the following with reference to embodiments of the invention wherein the examples given are for the purpose of illustrating preferred embodiments only and not for the purpose of limiting the same.

EXAMPLE 1

*Condensation of urea and isobutyl aldehyde*

4175 g. of 20% urea aqueous solution is acidified by hydrochloric acid to pH 4.5 followed by an addition of 454 g. of isobutyl aldehyde at a room temperature to form two liquid phases. By subsequent mixing and stirring isobutyl aldehyde dissolves in the aqueous phase to form a homogeneous liquid accompanied by the evolution of heat thereby the temperature elevates up to about 60° C. By further stirring precipitation begins to take place in 5 to 6 min. and the reaction is almost finished in 10 min., while converting the whole into a slurry from which obtained is 1150 g. of product by subsequent filtration, washing, and drying.

It is confirmed by an elementary analysis of the elements that this product comprises substantially pure isobutylidene diurea, TN of which being 32.1 wt. percent.

EXAMPLE 2

*Condensation of urea and isobutyl aldehyde*

An addition of 36 g. of isobutyl aldehyde made to 132 g. of 50% urea aqueous solution followed by a vigorous stirring at a room temperature results in gradual dissolution of isobutyl aldehyde followed by formation of a homogeneous phase. While maintaining the stirring precipitation begins to take place and finally the whole liquor solidifies. The time required for the reaction takes about 10 min. The solidified product in dry state weighs 100 g.

An analysis of the product shows 30.8% nitrogen in total (TN) by weight and 98 of Availability Index (AI).

About one tenth of TN is nitrogen as unreacted urea (UN), the remaining nine tenth being nitrogen in the reaction product (RN). The latter is cold water-insoluble but hot water-soluble.

EXAMPLE 3

*Availability index (A.I.)*

Availability Index (A.I.) of various condensation reaction products is measured in accordance with AOAC method, i.e., a method of analysis provided by the Association of Official Agricultural Chemists of U.S.A.

The preparation of condensation reaction products provided for the example is the same to that of Example 2 while giving a wide variation in pH of the starting urea aqueous solution and the molar ratio of urea to isobutyl aldehyde.

The results of the measurement are shown in Table 1 as follows:

TABLE 1

| | pH | U/A | TN | UN | UN/TN | RN | RN/TN | AI |
|---|---|---|---|---|---|---|---|---|
| A | Acid | 1.5 | 31.7 | 10.1 | 32 | 21.6 | 68 | 97 |
| B | do | 2.5 | 34.6 | 15.4 | 45 | 19.2 | 54 | 98 |
| C | Neutral | 1.5 | 32.3 | 12.3 | 38 | 20.0 | 62 | 96 |
| D | do | 2.5 | 36.4 | 19.4 | 53 | 17.0 | 47 | 98 |
| E | Alkaline | 1.5 | 32.7 | 14.5 | 45 | 8.2 | 55 | 99 |
| F | do | 2.5 | 37.6 | 22.2 | 59 | 15.4 | 41 | 98 |
| G | Alk.→acid | 1.0 | 30.4 | 12.5 | 41 | 17.9 | 59 | 98 |
| H | do | 2.0 | 34.0 | 16.7 | 49 | 17.3 | 51 | 98 |
| I | Latent acid of ammonium sulphate | 1.0 | 29.4 | 12.9 | 44 | 16.5 | 56 | 99 |
| J | do | 2.0 | 31.6 | 16.8 | 53 | 14.8 | 47 | 98 | small AI is considered of inferior manuring effect so that it is not practicable to employ one which is less than 50 of AI even for lawn or grass, AI in the neighborhood of 100 being desirable especially for farmland crops.

Inasmuch as the condensation product of isobutyl aldehyde with urea shows well-nigh 100 of AI, the manuring effect is considered sufficiently practicable.

Whilst values of TN, UN, RN, etc. in addition to AI are shown in Table 1, TN is the value measured in accordance with the Kjeldahl method, and UN is the value measured by the MgO distillation method following the decomposition of the sample by urease. The other values are calculated on the basis of measured TN or UN.

Remarks: Because of the hydrolysis of isobutylidene diurea which took place in the course of analysis operation the analytical values of UN in Table I were found larger than the real values.

EXAMPLE 4

*Dissolution and hydrolysis of isobutylidene diurea*

1 g. of isobutylidene diurea having 32.1% N, obtained in Example 1 is added to 100 cc. of water having an adjusted pH and the resultant is left as it dissolves at a constant temperature for 7 to 21 days. The measurement of the dissolved amount of TN and UN in the resultant and subsequent calculation of UN/TN×100, the degree of hydrolysis are made.

Table II shows the results of the measurement.

TABLE II

| Condition | | Amount of dissolution and Degree of Hydrolysis | pH | | | |
|---|---|---|---|---|---|---|
| °C. | Day | | 4 | 5 | 6 | 7 |
| 30 | 7 | TN (mg) | 301 | 206 | 173 | 172 |
| | | UN (mg) | 294 | 197 | 165 | 146 |
| | | Degree of Hydrolysis | (97.7) | (95.6) | (95.5) | (85.0) |
| 30 | 14 | TN | 302 | 279 | 277 | 227 |
| | | UN | 296 | 274 | 267 | 212 |
| | | Degree of Hydrolysis | (98.0) | (98.3) | (96.4) | (93.5) |
| 30 | 21 | TN | 308 | 299 | 292 | 292 |
| | | UN | 302 | 296 | 289 | 278 |
| | | Degree of Hydrolysis | (98.0) | (99.0) | (99.0) | (95.3) |
| 10 | 7 | TN | 122 | 52 | 35 | 24 |
| | | UN | 110 | 26 | 6 | 4 |
| | | Degree of Hydrolysis | (90.3) | (50.0) | (17.2) | (16.7) |
| 10 | 14 | TN | 151 | 64 | 39 | 33 |
| | | UN | 142 | 37 | 11 | 6 |
| | | Degree of Hydrolysis | (94.0) | (57.8) | (28.2) | (18.2) |
| 10 | 21 | TN | 180 | 86 | 45 | 36 |
| | | UN | 178 | 85 | 25 | 8 |
| | | Degree of Hydrolysis | (99.0) | (98.8) | (55.6) | (22.1) | wherein denotes

U/A: molar ratio of urea to isobutyl aldehyde
TN: content in percent of total nitrogen
UN: content in percent of nitrogen as urea
UN/TN: ratio of UN to TN in percent
RN: content in percent of nitrogen in reaction product
RN/TN: ratio of RN to TN in percent AI: $\dfrac{\text{hot water-soluble but cold water-insoluble nitrogen}}{\text{cold water-insoluble nitrogen}} \times 100$ This method of analysis is conventional for the inspection of grade of "Urea-form," among which one having In view of the fact that according to Table II the smaller pH the larger TN in solution and simultaneously the larger UN, TN, it may be concluded that the dissolution of isobutylidene diurea is due to hydrolysis.

Further, Table II shows that the degree of hydrolysis increases with higher temperature and with longer duration.

Since isobutylidene diurea contained in the fertilizer of the invention is a compound which is slightly soluble in water, when manured, it is not easy to leach. However, once leached out in soil isobutylidene diurea is liable to subject to hydrolysis by hydrogen ion in soil and hydrogen ion produced from plant root, imparting crops the same manuring effect as urea.

EXAMPLE 5

*Test of manuring effect on rice*

Samples A and B prepared in Example 3 and urea are mixed with 3 kg. each of soil, respectively, and the individual resultant mixture is put in a pot of 1/5000 are, and given a successive watering to grow paddy-land rice. The fertilizer manured weighs 0.4 g. as N in each case.

As rice grows measurements are made in respect of the height of the plant and the number of the stem followed by a survey of the yield upon completion of the growth.

The results are shown by Table II on which the value denotes an average of three pots.

TABLE III

|  | Urea | A | B |
|---|---|---|---|
| Growth: |  |  |  |
| First period: |  |  |  |
| Ht. of plant (cm.) | 26.9 | 27.3 | 27.4 |
| Number of stem | 4.0 | 4.0 | 3.3 |
| Second period: |  |  |  |
| Ht. of plant (cm.) | 48.8 | 45.8 | 46.5 |
| Number of stem | 11.3 | 11.3 | 10.3 |
| Third period: |  |  |  |
| Ht. of plant (cm.) | 70.2 | 73.7 | 72.5 |
| Number of stem | 20.0 | 24.3 | 23.3 |
| Yield: |  |  |  |
| Length of straw | 71.5 | 77.5 | 76.5 |
| Number of ear | 17.3 | 19.3 | 19.0 |
| Weight of straw | 47.0 | 50.0 | 50.7 |
| Weight of ear | 32.7 | 37.0 | 35.7 |
| Index of ear wt | 100 | 113 | 109 |

In the initial growth of plant to which Samples A and B of the invention are manured the growth of early stage is delayed by about one week as compared with what is manured with urea. The growth thereafter, however, is so enhanced that the number of tillering of the former surpasses the latter. Moreover, in the later stage of tillering period, the color of the leaves of the plant manured with urea fades away because of fertilizer deficiency, but that of the plant manured with Samples A and B maintains a deep color, indicating the persistency of the manuring effect.

The reasons why the plant manured with Samples A and B is excellent in the later period of growth bringing a larger yield may be attributed to the facts as follows:

(a) Because of the slower rate of dissolution the germination of manuring effect is delayed.

(b) The denitrify loss due to conversion to nitric acid in the initial period is small.

(c) Aldehyde arrests the reduction of soil.

These facts may be taken as an illustration of high manuring effect of the fertilizer of the invention.

EXAMPLE 6

*Testing of manuring effect on wheat*

Urea, isobutylidene diurea, crotonylidene diurea, a mixture composed of same amount of urea and isobutylidene diurea, and a mixture composed of same amount of urea and crotonylidene diurea are mixed with 3 kg. each of soil for preparing fertilizers for use of cultivating wheat. The individual resultant is put in a pot of 1/5000 are to observe the manuring effect.

Results of a survey regarding the growth and the yield are shown by Table IV wherein the value indicates an average of three pots.

TABLE IV

|  | Urea | Isobutylidene diurea | | Crotonylidene diurea | |
|---|---|---|---|---|---|
| Urea content (percent) | 100 | 0 | 50 | 0 | 50 |
| Growth: |  |  |  |  |  |
| First period: |  |  |  |  |  |
| Ht. of plant (cm.) | 10.1 | 9.6 | 9.6 | 12.9 | 11.7 |
| Number of stem | 5.9 | 5.3 | 5.2 | 4.8 | 5.8 |
| Second period: |  |  |  |  |  |
| Ht. of plant (cm.) | 24 | 26 | 27 | 24 | 29 |
| Number of stem | 12.3 | 10.7 | 10.7 | 5.7 | 9.7 |
| Third period: |  |  |  |  |  |
| Ht. of plant (cm.) | 53 | 59 | 60 | 48 | 60 |
| Number of stem | 11.0 | 8 | 9.3 | 3.3 | 5.7 |
| Yield: |  |  |  |  |  |
| Number of ear | 14.7 | 12.0 | 13.0 | 4.5 | 11.7 |
| Weight of straw (g.) | 23.1 | 19.1 | 21.5 | 5.3 | 16.4 |
| Weight of ear (g.) | 21.4 | 19.0 | 22.0 | 12.1 | 17.9 |

In the case where isobutylidene diurea or a mixture consisting of the same and urea is used, better or the same results as in the case where urea is alone manured are obtained.

Besides, in the case where crotonylidene diurea is used an obviously inferior result is seen as compared with the case where isobutylidene diurea is used. This is attributed to the injury by croton aldehyde produced by hydrolysis of crotonylidene diurea as will be illustrated in Example 7 as follows.

EXAMPLE 7

*Test of injury by free aldehydes*

Seeds of paddy land rice are sprouted on a net and made grown 7.5 cm. in plant height and 9.5 cm. in root length, and transplanted to a Wagner pot of 1/5000 are in 8 plants each, one plant being composed of 2 seedlings, followed by watering. The composition of the watering liquid is as follows:

| Component | Concentration (p.p.m.) | Salt used |
|---|---|---|
| N | 5.0 | $NH_2CONH_2$ |
| $P_2O_5$ | 3.0 | $Na_2HPO_4 \cdot 12H_2O$ |
| $K_2O$ | 3.5 | $KCl$ |
| MgO | 1.5 | $MgSO_4 \cdot 7H_2O$ |
| $Fe_2O_3$ | 1.0 | $FeCl_3 \cdot 6H_2O$ |
| Mn | 0.5 | $MnCl_2 \cdot 4H_2O$ |
| CaO | 1.0 | $CaCl_2 \cdot 2H_2O$ |

Further, various kinds of aldehyde are added to this liquid so as to make the concentration 0.5 to 0.05 mmol. The resultant liquid is regenerated every three days and 4 weeks later the plant is dried followed by measurements in respect of total weight, weight of root, and weight of plant top.

The results are shown by Table V wherein the value denotes one plant consisting of two seedlings in mg.

TABLE V

| Aldehyde added | Concentration (mmol) | | | |
|---|---|---|---|---|
| | 0.05 | 0.1 | 0.25 | 0.5 |
| Formaldehyde: | | | | |
| Total | 259 | 168 | 102 | 83 |
| Root | 108 | 72 | 54 | 42 |
| Plant top | 151 | 96 | 48 | 41 |
| Acetaldehyde: | | | | |
| Total | 336 | 283 | 193 | 171 |
| Root | 147 | 132 | 97 | 88 |
| Plant top | 189 | 151 | 96 | 83 |
| Isobutylaldehyde: | | | | |
| Total | 347 | 323 | 308 | 250 |
| Root | 142 | 131 | 123 | 111 |
| Plant top | 205 | 192 | 185 | 139 |
| Crotonaldehyde: | | | | |
| Total | 110 | 102 | 91 | 84 |
| Root | 44 | 43 | 43 | 42 |
| Plant top | 66 | 59 | 48 | 42 |
| No aldehyde: | | | | |
| Total | | 345 | | |
| Root | | 147 | | |
| Plant top | | 198 | | |

This table shows that injury by isobutyl aldehyde is minimum.

EXAMPLE 8

Leach test

Isobutylidene diurea and calcium superphosphate are mixed together with or without fused magnesium phosphate followed by grinding and granulating to form fertilizer granules having 3 mm. diameter.

A sample weighing 0.35 g. as N is taken out of the granulated fertilizer and put into a cylindrical filter paper, which is then put in a test tube having a bottom from which water is discharged, followed by continuous watering at a rate 300 cc. per hr. to measure TN leached out in the discharged water and pH thereof.

The results are shown in Table VI wherein values of TN denote the proportion of nitrogen leached out in percent to the total of nitrogen contained in the sample before watering.

TABLE VI

| Sample No. | 1 | 2 | 3 | 4 |
|---|---|---|---|---|
| Composition in weight: | | | | |
| Ca. superphosphate | 79.3 | 59.0 | 39.1 | 63.2 |
| Fused Mg phosphate | 0 | 19.7 | 39.1 | 21.1 |
| Isobutylidene diurea | 20.7 | 21.3 | 21.8 | *15.7 |
| N (percent) | 6.5 | 6.7 | 6.9 | 7.2 |
| P$_2$O$_5$ (percent) | 13.1 | 13.5 | 13.9 | 14.4 |
| After 1 hr.: | | | | |
| TN | 18.4 | 8.7 | 5.3 | 96.0 |
| (pH) | (3.6) | (6.5) | (6.6) | (6.2) |
| After 2 hrs.: | | | | |
| TN | 36.6 | 17.2 | 10.0 | 97.0 |
| (pH) | (3.7) | (6.6) | (6.6) | (6.3) |
| After 3 hrs.: | | | | |
| TN | 54.1 | 23.1 | 14.8 | 100 |
| (pH) | (3.9) | (6.6) | (6.7) | (6.5) |

* Urea is used in place of isobutylidene diurea.

The results as shown in the above table make clear the fact that in the case where manuring is made by use of a mixture consisting of isobutylidene diurea and calcium superphosphate and water in soil is absorbed by the fertilizer granules, isobutylidene diurea is rapidly hydrolized by virtue of the acidity of calcium superphosphate which is in the neighborhood of pH 3 and is easily leached out of the fertilizer granules. In case, however, calcium superphosphate is neutralized beforehand the amount of isobutylidene diurea to be leached is limited to what corresponds to the reduced solubility of isobutylidene diurea by neutralization. That is to say, the amount of isobutylidene diurea to be leached is suitably adjusted by way of the regulation of pH. In addition, it is presumed that once leached out of the fertilizer granules isobutylidene diurea is rapidly hydrolized by virture of the acidity of soil or the acidity of plant root, indicating thereafter the same manuring effect as urea; in other words, the rate of germination of the manuring effect depends on the solubility of isobutylidene diurea in the fertilizer granules.

Although a large amount of water is employed for leaching in the test, in practice the amount of water in soil is much less than in the test. Hence the difference in the rate of leaching will apparently increase as compared with the values as represented in the table.

EXAMPLE 9

Test of heat decomposition

A sample is prepared by mixing an amount of isobutylidene diurea with the same amount of a mixture consisting of calcium superphosphate and fused magnesium phosephate in various proportion. A certain amount of the resultant sample is taken out on a thermo balance and heated at a rate of 1.2±0.2° C. per min. to measure the volatilisation loss.

The results of the measurement are shown in Table VII wherein iB, S and F denotes isobutylidene diurea, calcium superphosphate and fused magnesium phosphate, respectively, and the volatilisation loss represented in percent is based on the weight before the heating.

TABLE VII

[SAMPLE]

| Temp., °C. | iB | pH | | | | |
|---|---|---|---|---|---|---|
| | | 2.95 | 4.80 | 5.78 | 6.48 | 7.20 |
| | | iB S:F 100:0 | iB S:F 90:10 | iB S:F 75:25 | iB S:F 50:50 | iB S:F 25:75 |
| 50 | | 0 | 0 | 0 | 0 | |
| 60 | | 0.2 | 0 | 0 | 0 | |
| 70 | | 0.5 | 0 | 0 | 0 | |
| 80 | | 1.2 | 0.2 | 0 | 0 | |
| 90 | | 1.8 | 1.0 | 0.5 | | |
| 100 | | 2.3 | 1.8 | 1.2 | | |
| 110 | 0.1 | 3.4 | 3.1 | 2.4 | 0.2 | |
| 120 | 0.4 | 4.6 | 3.9 | 3.2 | 0.8 | |
| 130 | 0.7 | 6.1 | 4.2 | 3.7 | 1.1 | |
| 140 | 1.0 | 7.5 | 5.0 | 4.4 | 1.4 | 1.0 |
| 150 | 1.7 | 10.0 | 7.7 | | 1.8 | 1.3 |
| 160 | 2.5 | | 25.2 | | 3.5 | 2.0 |
| 170 | 5.2 | | | | 12.5 | 8.3 |
| 180 | | | | | 16.2 | |

The results shows that although isobutylidene diurea alone is relatively stable against heat and consequently the volatile loss is small, the volatile loss is large and the decomposition becomes intense when it is mixed with calcium superphosphate having low pH, but that the volatile loss becomes smaller in proportion to the mixed amount of fused magnesium phosphate if pH is raised by mixing fused magnesium phosphate.

Accordingly, it is obviously possible in manufacturing granular mixed fertilizer to check the heat decomposition in the course of drying procedure after granulation by way of adjusting beforehand the pH of mixed fertilizer to neutrality by use of alkaline material.

EXAMPLE 10

To 800 g. of 50% aqueous urea solution is added 120 g. of isobutyl aldehyde for reaction under cooling and stirring and is left to stand at room temperatures for solidification. The reaction product weighs when dried 500 g. with 36.7% TN. This is the condensation reaction product of urea and isobutyl aldehyde containing an excess of urea.

Separately, 750 g. of calcium superphosphate containing 16.5% of water-soluble P$_2$O$_5$, 250 g. of fused magnesium phosphate containing 19% of citric acid-soluble P$_2$O$_5$, and 300 g. of potassium chloride containing 60.5% of K$_2$O are ground and mixed followed by an addition of 500 g. of the aforesaid reaction product and adequate mixing. The resultant mixture is granulated in a granulation apparatus while spraying water and dried to obtain 1800 g. of granular mixed fertilizer. The product having the following analytical values contains nitrogen of which about 40% is slightly soluble in water. C–P$_2$O$_5$ denotes citric acid-soluble P$_2$O$_5$.

| | Percent |
|---|---|
| TN | 10.23 |
| UN | 5.46 |
| C–P$_2$O$_5$ | 10.02 |
| K$_2$O | 10.08 | pH, 5.60.

EXAMPLE 11

1350 g. of calcium superphosphate containing 16.5% of water-soluble P$_2$O$_5$ and 250 g. of potassium chloride containing 60.5% of K$_2$O and 600 g. of an urea-isobutyl aldehyde condensation product produced in the same manner as in Example 10 are ground and mixed. The resultant mixture is subjected to granulation while spraying 230 g. of 8% aqueous ammonia. The granules are dried to obtain 2200 g. of product of which analysis is shown below. About 40% of nitrogen contained in the product proves slightly soluble in water. AN denotes nitrogen as ammonia and S—P$_2$O$_5$ as ammonium citrate-soluble P$_2$O$_5$, respectively.

| | Percent |
|---|---|
| TN | 10.55 |
| AN | 0.65 |
| K$_2$O | 6.82 |
| UN | 5.83 |
| S—P$_2$O$_5$ | 10.04 | pH, 4.90.

We claim:

1. A gradually available fertilizer which is the product of condensation of isobutyl aldehyde with urea in the ratio of at least 2 of urea to 1 of isobutyl aldehyde.

2. Fertilizer composition consisting essentially of isobutylidene diurea and an inert carrier therefor.

3. Fertilizer consisting essentially of isobutylidene diurea and urea and an inert carrier.

4. Fertilizer composed of a mixture of isobutylidene diurea and at least one selected from the group consisting of water-soluble nitrogenous fertilizers, phosphatic fertilizers and potassium fertilizers.

5. A method of fertilizing the soil which comprises distributing over said soil the condensation reaction product of isobutyl aldehyde with urea in which the ratio of urea to the aldehyde is at least 2 to 1.

6. A method of fertilizing the soil which comprises distributing over said soil isobutylidine diurea.

7. A method according to claim 5 characterized in that molar ratio of urea to said aldehyde is 2–10 to 1.

8. A method according to claim 5 characterized in that the molar ratio of urea to said aldehyde is 2–4 to 1.

References Cited

UNITED STATES PATENTS

| 2,157,541 | 5/1939 | Hosokawa et al. | 71—28 |
| 2,264,400 | 12/1941 | Ott et al. | 260—553 |
| 2,572,256 | 10/1951 | Garner et al. | 260—68 |
| 2,592,809 | 4/1952 | Kraloves et al. | 71—30 X |
| 2,729,611 | 1/1956 | Chesley et al. | |
| 2,960,534 | 11/1960 | Scherer et al. | 260—553 |
| 3,054,669 | 9/1962 | Jung et al. | 71—28 |
| 3,061,641 | 10/1962 | Wright et al. | 260—553 |

OTHER REFERENCES

Belgium Patent Report, No. 65B, June 25, 1960, p. A14.

Pandya et al., Chemical Abstracts, vol. 44 (1950), col. 4415 (abstract of Proc. Ind. Acad. Sci. vol. 27A (1948) pp. 196–201).

Winson et al., "Journal of the Science of Food and Agriculture," vol. 9, April 1958.

DONALL H. SYLVESTER, *Primary Examiner.*

MAURICE A. BRINDISI, A. SCIAMANNA, JOHN D. RANDOLPH, NICHOLAS S. RIZZO, H. CARTER, H. R. JILES, G. R. MYERS, *Assistant Examiners.*